United States Patent [19]

Muller et al.

[11] Patent Number: 4,725,811
[45] Date of Patent: Feb. 16, 1988

[54] WIND SHEAR DETECTION AND ALERTING SYSTEM

[75] Inventors: Hans R. Muller, Redmond; John H. Glover, Kirkland, both of Wash.

[73] Assignee: Sundstrand Data Control, Inc., Redmond, Wash.

[21] Appl. No.: 829,731

[22] Filed: Feb. 13, 1986

[51] Int. Cl.⁴ ............................................. G08B 23/00
[52] U.S. Cl. ................................. 340/968; 73/178 T; 244/181; 340/963; 340/967; 364/433
[58] Field of Search ............... 340/945, 963, 964, 974, 340/966–970, 975, 979; 364/433–435; 73/178 R, 178 T; 244/1 R, 181, 182

[56] References Cited

U.S. PATENT DOCUMENTS

| | | | |
|---|---|---|---|
| 3,126,474 | 3/1964 | Zweibel et al. | 244/181 |
| 3,618,002 | 11/1971 | Stinson | 340/968 |
| 3,748,900 | 7/1973 | Lindquist | 364/435 |
| 3,814,912 | 6/1974 | Manke et al. | 340/967 |
| 3,947,808 | 3/1976 | Bateman | 340/970 |
| 3,948,096 | 4/1976 | Miller | 244/181 |
| 4,043,194 | 8/1977 | Tanner | 340/968 |
| 4,079,905 | 3/1978 | Greene | 340/968 |
| 4,095,271 | 6/1978 | Muller | 340/975 |
| 4,106,731 | 8/1978 | Bliss | 340/968 |
| 4,127,249 | 11/1978 | Lambregts | 340/945 |
| 4,189,777 | 2/1980 | Kuntman | 340/968 |
| 4,229,725 | 10/1980 | Reilly | 340/968 |
| 4,281,383 | 7/1981 | Lebrun | 340/968 |
| 4,343,035 | 8/1982 | Tanner | 364/434 |
| 4,536,843 | 8/1985 | Lambregts | 364/434 |
| 4,593,285 | 6/1986 | Miller et al. | 340/967 |

Primary Examiner—James L. Rowland
Assistant Examiner—Brent A. Swarthout
Attorney, Agent, or Firm—Mason, Kolehmainen, Rathburn & Wyss

[57] ABSTRACT

A wind shear detection and alerting system (30) compares inertially derived accelerations with air speed rate to provide a wind shear warning signal. Inertially derived accelerations are used instead of purely inertial accelerations because purely inertial systems generally require a vertical gyro. By utilizing angle of attack ($\alpha$) and flight path angle ($\gamma$) instead of pitch angle ($\theta$) in the calculation, no vertical gyro signal is required and the system will be responsive to vertical as well as horizontal shear conditions. An enhanced version of the system is also compensated for roll angle ($\phi$), with the roll angle being derived from the rate of change of heading ($\Psi$) to avoid the need for a vertical gyro. The alerting system is capable of providing visual and aural warnings for a variety of wind shear conditions, such as, head shear, tail shear, head shear followed by tail shear and wind shear trend. The waring system is also capable of providing a wind shear warning which is a function of the radio altitude of the aircraft.

23 Claims, 9 Drawing Figures

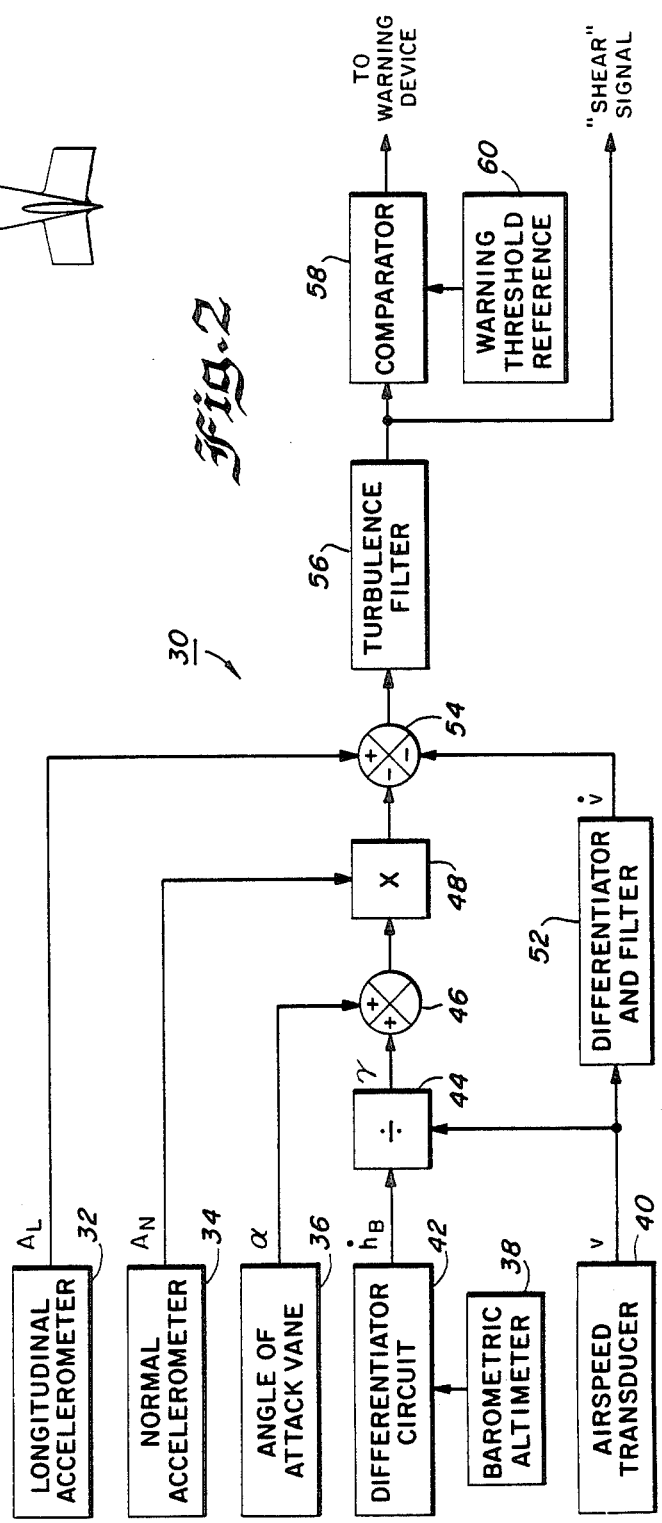
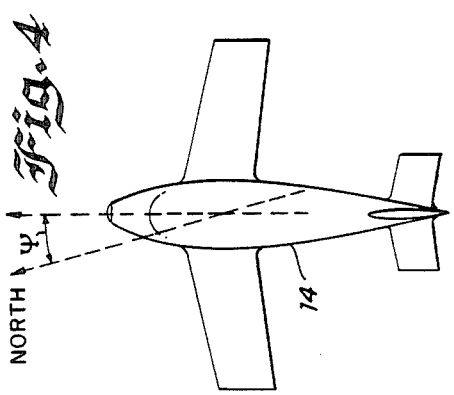
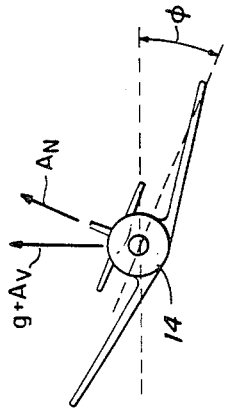
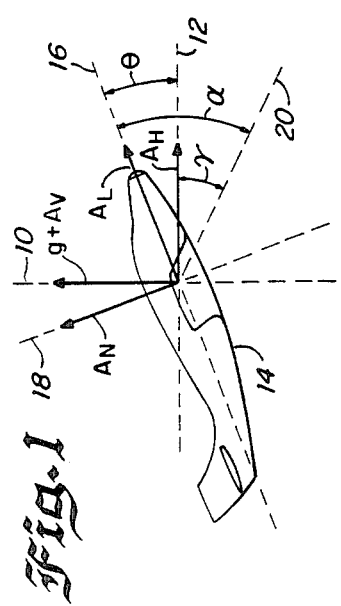

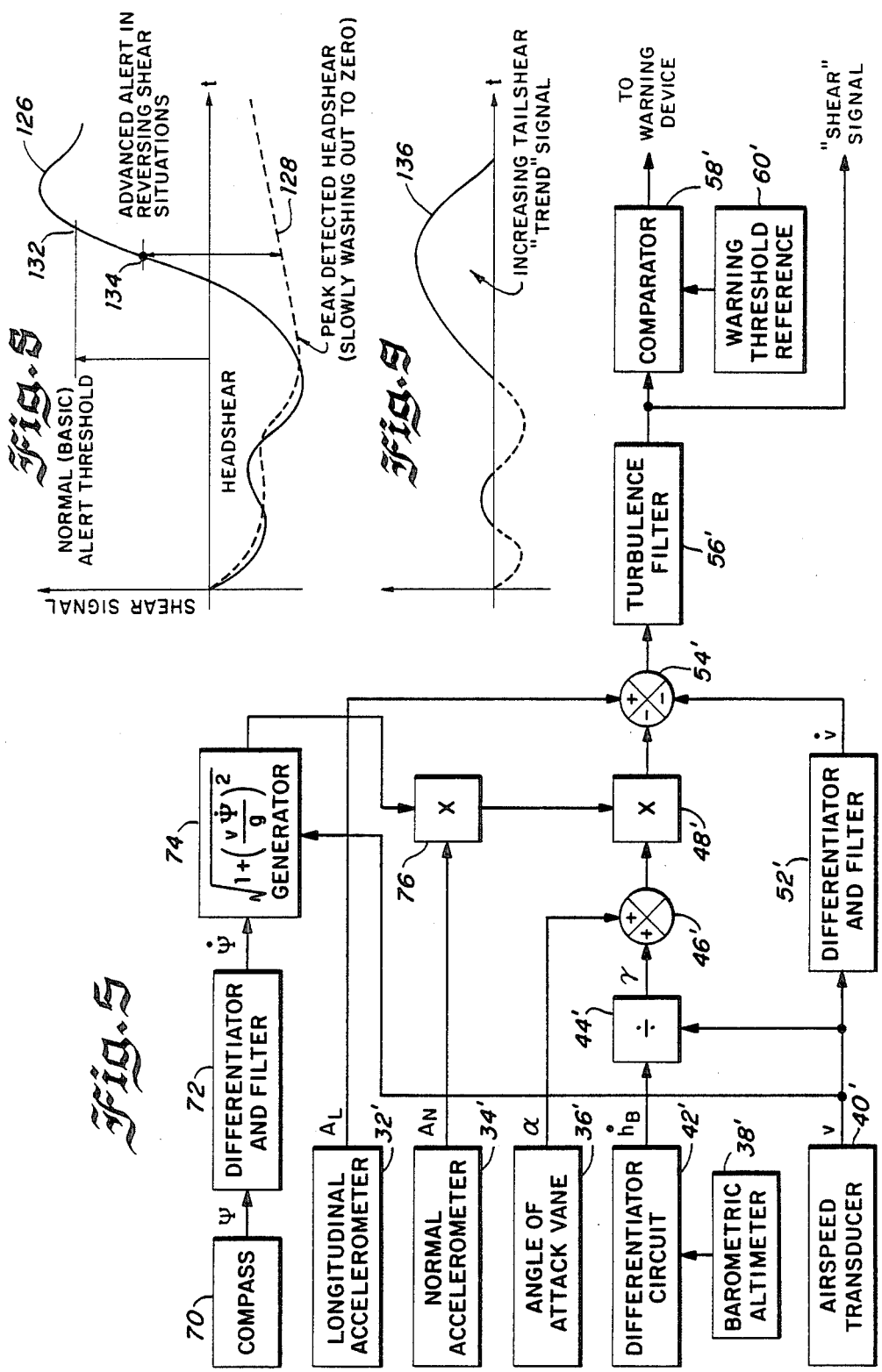

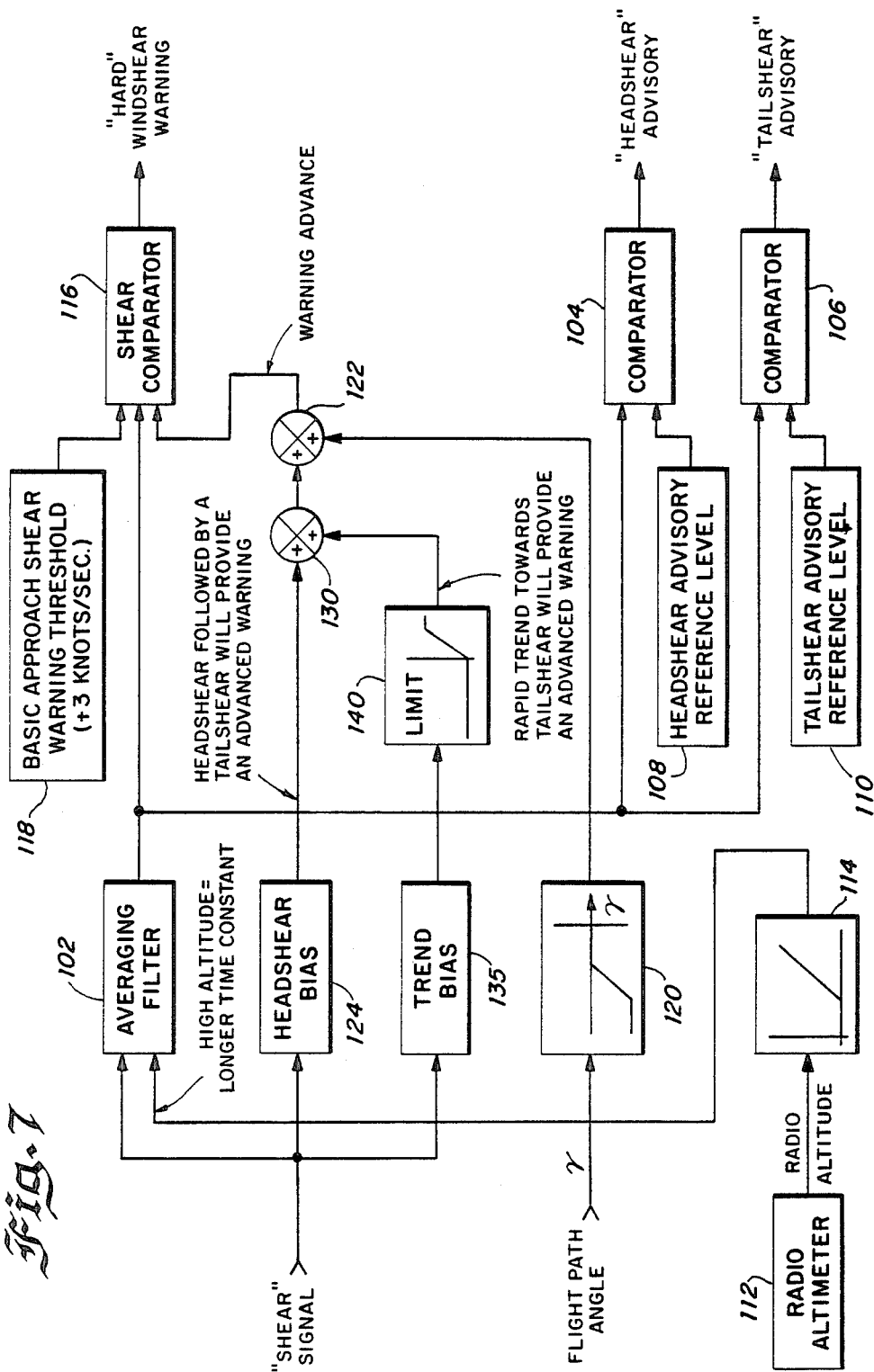

WIND SHEAR DETECTION AND ALERTING SYSTEM

BACKGROUND OF THE INVENTION

1. Field of the Invention

This invention relates generally to wind shear detection systems, and more particularly to airborne wind shear detection systems for alerting the pilot of a wind shear condition if the aircraft penetrates a wind shear condition of sufficient force to pose a hazard to the aircraft

2. Description of the Prior Art

Various wind shear detection systems are known. Among these include ground based systems such as systems that utilize a plurality of wind speed and direction measuring stations placed about an airport in conjunction with a system for analyzing the magnitude and direction of the wind at the various stations to provide an indication of a wind shear condition. Other ground based systems utilize Doppler radars located at airports Airborne systems are also known. Among such systems are systems that compare air mass derived parameters such as air speed with ground speed derived from a radar system. In the event of a rapid change in air speed relative to ground speed, a wind shear condition is indicated. Other systems compare air mass derived signals with inertially derived signals to generate a signal representative of wind shear when the rate of change inertially derived parameters meters varies from the rate of change of air mass derive parameters by a predetermined amount. Two such systems are disclosed in U.S. Pat. Nos. 4,012,713 and 4,079,905. Both of these patents disclose systems that compare a longitudinal accelerometer signal that has been corrected for the effect of gravity with an air speed rate signal and provide a wind shear signal when the difference between the accelerometer derived and the air speed derived signals exceeds a predetermined amount. The '905 patent also takes into account a downdraft drift angle that is a function of vertical acceleration and air speed. Still other systems monitor the rate of change of deviation from a glide slope beam or an ILS beam to provide a signal representative of wind shear.

While all of these systems do provide some indication of wind shear, the ground based systems are responsive only to conditions in the vicinity where the transducers are placed, and are not responsive to dangerous types of wind shear such as microbursts which form and dissipate rapidly.

While airborne wind shear protection systems are more responsive to conditions in the vicinity of the aircraft than are ground based systems, many of them require Doppler radar or signals such as inertial navigation signals, glide slope signals and other signals that are not available on older aircraft. In addition, it is desirable to develop warning criteria which provide a signal that is a measure of wind shear, determine when a wind shear is hazardous without generating excessive nuisance warnings and provide guidance for the pilot when responding to a wind shear indication.

SUMMARY OF THE INVENTION

Thus, it is an object of the present invention to provide a wind shear detection system that overcomes many of the disadvantages of the prior art systems.

It is yet another object of the present invention to provide a wind shear detection system that utilizes signals that are present in most aircraft.

It is yet another object of the present invention to provide a wind shear detection system that does not require the use of any gyroscopic references.

It is yet another object of the present invention to provide a wind shear detection system that provides a signal that is a measure of wind shear which can be used to provide a wind shear alert and guidance to the pilot.

Thus, in accordance with a preferred embodiment of the invention, there is provided a wind shear detection system that requires only normal and longitudinal accelerometer signals, an angle of attack vane signal, a barometric altimeter signal and an air speed signal from the aircraft. These signals are employed in a shear equation that utilizes longitudinal acceleration, normal acceleration, angle of attack, flight path angle and air speed to generate a number that is a function of the aforesaid variable and provides an indication of wind shear. In addition, the wind shear equation may be compensated for the effects of roll by deriving a roll angle signal from the rate of change of heading to eliminate the need for a vertical gyroscope.

The alerting system is responsive to the wind shear signal and capable of providing visual and aural warnings for a variety of wind shear conditions, such as head shear, tail shear, head shear and the trend of a wind shear signal. An alert is also provided when a condition exists where head shear is followed by tail shear because such a condition can cause the aircraft to stall if appropriate action is not taken. The alerting system can also be made responsive to a wind shear signal as a function of radio altitude.

DESCRIPTION OF THE DRAWING

These and other objects and advantages will become readily apparent upon consideration of the following detailed description and attached drawing wherein:

FIG. 1 is a vector diagram illustrating the relationship between the various parameters used to determine wind shear in the system according to the present invention;

FIG. 2 is a block diagram illustrating the basic principles of operation of the system according to the invention;

FIGS. 3 and 4 are vector diagrams defining the roll angle and headings of an aircraft;

FIGS. 5 and 6 are block diagrams of a roll angle compensated wind shear detection system;

FIG. 7 is a block diagram illustrating logic circuitry that is responsive to a "shear" signal for generating warning and advisory signals; and FIGS. 8 and 9 are waveforms of two "shear" signals that cause the logic circuitry of FIG. 6 to provide an advanced warning.

DETAILED DESCRIPTION

Figure 6:
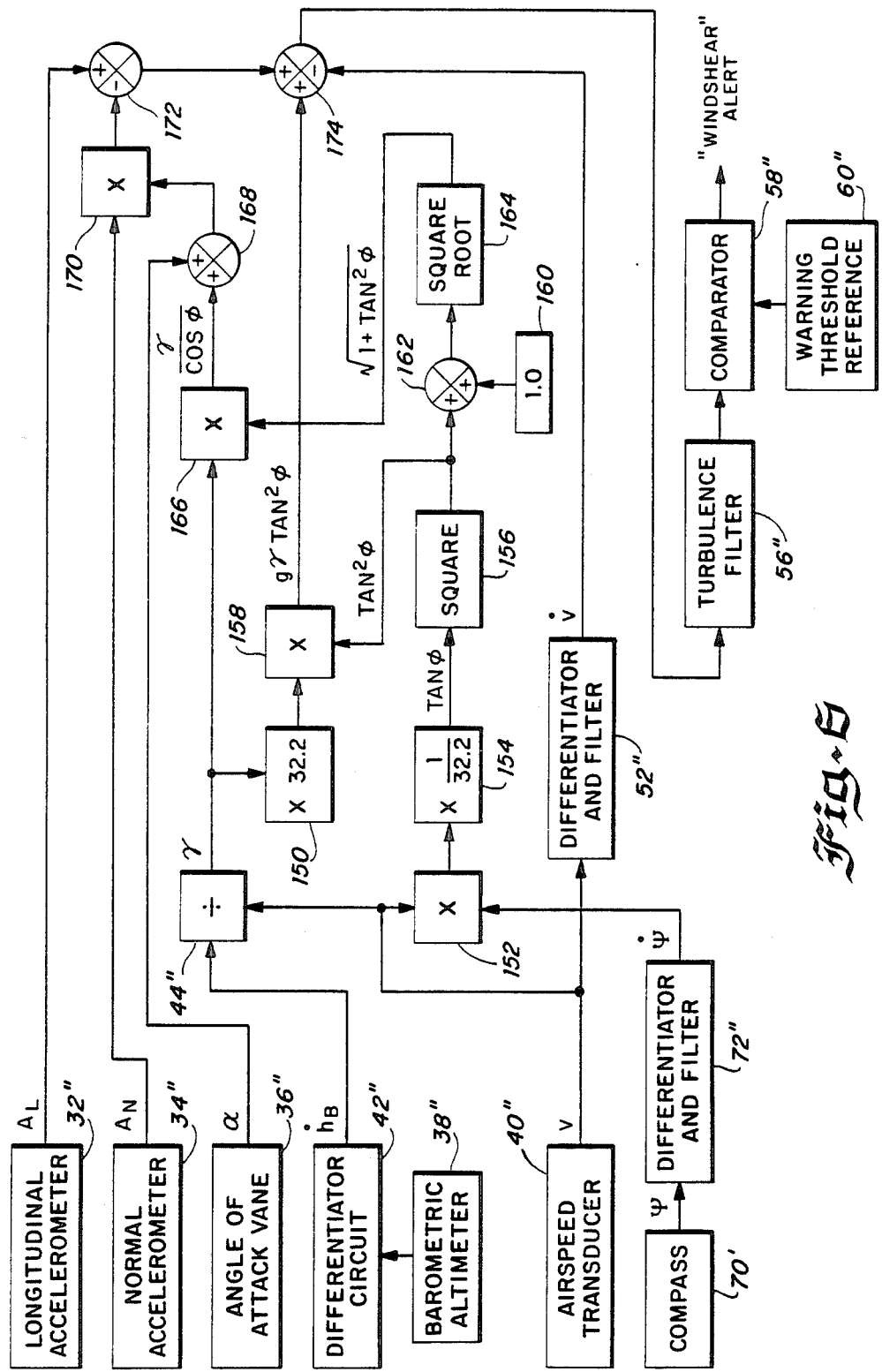

During the description of the present invention, various accelerations such as longitudinal acceleration, normal acceleration and various angles such as pitch angle, flight path angle, etc. will be discussed, and these angles and accelerations are illustrated in FIG. 1. Throughout the discussion herein, it should be understood that the term "inertial acceleration signal" can refer to related signals other than pure inertial acceleration signals, such as an inertial derived signal, derived from inertial and non-inertial transducers.

Referring to FIG. 1, there is shown a pair of horizontal and vertical coordinates designated by the reference numerals 10 and 12, respectively. A representation of an aircraft 14 is also shown in FIG. 1, and a pair of vectors 16 and 18 represent the longitudinal and normal axes of the body of the aircraft, with the vector 16 passing through the longitudinal center line of the aircraft and the vector 18 being perpendicular to the vector 16. A dashed line 20 represents the flight path of the aircraft, and in the illustration of FIG. 1 represents a descending flight path.

The angle between the horizontal axis 12 and the longitudinal axis 16 of the aircraft is defined as the pitch angle and represented by the symbol $\theta$. The angle between the flight path 20 and the horizontal reference 12 is defined as the flight path angle and is represented by the symbol $\gamma$. The angle between the longitudinal axis of the aircraft 16 and the flight path 20 is known as the angle of attack of the aircraft and is represented by the symbol $\alpha$. The flight path angle $\gamma$ is negative for a positive for ascent. Thus the pitch angle $\theta$ is equal the flight path angle $\theta$ plus the angle of attack $\alpha$.

In addition, various accelerations and accelerometer signals will be discussed. One such signal is a longitudinal accelerometer signal, $A_L$ which is the signal obtained from an accelerometer mounted parallel to the longitudinal axis 16 of the aircraft. The signal from the longitudinal accelerometer is a function of the longitudinal acceleration of the aircraft, and because of the influence of gravity, the pitch angle $\theta$. Another such signal is the normal accelerometer to the normal signal $A_N$ which is the signal obtained from an accelerometer positioned parallel to the normal axis 18 of the aircraft. The normal accelerometer signal is a function of acceleration along the normal axis of the aircraft as well as gravity and pitch angle. Horizontal acceleration, $A_H$, is a signal representative of acceleration along the horizontal axis 12. An accelerometer mounted parallel to the horizontal axis 12 would provide the horizontal acceleration signal, $A_H$. Finally, a vertical acceleration signal $A_V$ is a signal representative of acceleration along the vertical axis 10. An accelerometer mounted parallel to the vertical axis 10 would provide a signal representative of the sum of any vertical acceleration and the effects of gravity, g, or 32.2 feet/second.

Recapitulating the above, the various accelerations and angles to be considered are as follows:
$A_N$ = normal accelerometer signal
$A_L$ = longitudinal accelerometer signal
$A_H$ = horizontal acceleration
$A_V$ = vertical acceleration
g = gravity = 32.2 feet/second
$\alpha$ = angle of attack (AOA)
$\theta$ = pitch angle
$\gamma$ = flight path angle.

In determining some of the above parameters, other parameters will be required. These include:
v = air speed rate
h = barometric altitude rate
v = air speed
$\phi$ = roll angle.

The principle behind obtaining a wind shear representative signal is to compute a horizontal acceleration signal based primarily on inertially derived parameters and to compare the computed horizontal acceleration signal with an air mass derived acceleration signal such as air speed rate. The differences between these two signals will be a measure of wind shear. Because in the present system, only normal and longitudinal accelerometer signals $A_N$ and $A_L$, are employed, the horizontal acceleration $A_H$ must be computed. The computation is as follows:

$$A_L = A_H \cos\theta + (g + A_V) \sin\theta \quad (1)$$

$$A_N = (g + A_V) \cos\theta - A_H \sin\theta \quad (2)$$

Substituring the quant $(g + A_V)$ from equation (2) into equation (1), we obtain:

$$A_L = \frac{A_H}{\cos\theta} + A_N \tan\theta \quad (3)$$

From equation (3) above, the horizontal acceleration $A_H$ can be if the pitch angle $\theta$ is known. However, to obtain the pitch angle directly, a vertical gyroscope is required. To avoid the need for a vertical gyroscope signal, the no wind conditions condition of the pitch angle being equal to the angle of attack plus flight path angle is utilized as follows:

$$\theta = \alpha + \gamma \quad (4)$$

Utilizing this condition, the need for a vertical gyroscope is avoided and the system also becomes sensitive to vertical winds and up and down drafts because angle of attack and flight path angle do not add up to pitch in the presence of vertical wind.

Making small angle approximations that for small angles $\cos\theta = 1$ and $\tan\theta = \theta$ in radians, equation (3) becomes:

$$A_L = A_H + A_N(\theta) \quad (5)$$

Rearranging terms to solve for horizontal acceleration, we obtain:

$$A_H = A_L = A_N(\theta) \quad (6)$$

Utilizing the no wind condition approximation for $\theta$, equation (6) becomes:

$$A_H = A_L - A_N(\alpha + \gamma) \quad (7)$$

Taking the difference between the inertially derived acceleration and air speed rate, the following shear equation results:

$$\text{Shear} = A_L - A_N(\alpha + \gamma) - v \quad (8)$$

A circuit for solving the shear equation (8) above is illustrated in FIG. 2, and generally designated by the reference numeral 30. Although the circuit is illustrated as a series of functional blocks for purposes of clarity, it should be understood that the system need not be implemented exactly as shown and that various analog and digital implementations are possible. The system 30 utilizes various inputs such as a signal from a longitudinal accelerometer 32 mounted parallel to the longitudinal axis of the aircraft, a normal accelerometer 34 mounted perpendicular to the longitudinal accelerometer 30 and an angle of attack vane 36, which may be, for example, a vane extending laterally from the side of the aircraft and orienting itself parallel to the local air flow past the vane. The angle of attack vane signal is combined with other parameters, such as flap position signals as well as a constant peculiar to a particular aircraft, to provide the angle of attack signal. In addition, a barometric altimeter 38 and an airspeed transducer 40 provide signals representative of the barometric altitude and airspeed, respectively. Although two separate instruments are shown, the barometric altitude and airspeed data can be obtained from an air data computer.

Because the flight path angle $\gamma$ cannot be obtained directly from any of the aforementioned transducers, the flight path angle $\gamma$ must be computed as follows:

$$\gamma = \arcsin(\dot{h}/v), \text{ which for small angles becomes} \quad (9)$$

$$\gamma = \dot{h}/v, \text{ where } \gamma \text{ is in Radians} \quad (10)$$

Thus by differentiating the signal from the barometric altimeter 38 (FIG. 2) by a differentiator circuit 42 to provide a barometric rate signal, $\dot{h}_B$, is obtained. If an air data computer or an inertial navigation system is available, the barometric rate signal may be obtained directly therefrom. If the barometric rate signal is divided by the airspeed signal, for example, by means of a divider circuit 44, a signal representative of the flight path angle $\gamma$ is obtained. The flight path angle signal thus obtained is added to the body angle of attack signal derived from the angle of attack vane 36 by a summing junction 46 to provide a signal representative of the sum of the angle of attack and flight path angle signals ($\alpha + \gamma$). The barometric vertical speed signal used for the computation of the flight path angle ($\gamma$), essentially indicates inertial vertical speed. Thus the resulting shear equation will also respond to vertical shears (e.g., up or down drafts) because the derived angle of attack ($\alpha$) and the inertially derived flight path angle ($\gamma$) do not add up to the pitch angle ($\theta$) in the presence of up or down drafts. The output of the summing junction 46 is multiplied by the normal accelerometer signal in a multiplication circuit 48 to provide the $A_N(\alpha + \gamma)$ term. The airspeed signal from the airspeed transducer 40 is differentiated and filtered by a differentiator and filter circuit 52 to provide an airspeed rate signal, $\dot{v}$. A summing junction 54 subtracts the signal from the multiplier circuit 42 and the signal from differentiator and filter circuit 52 from the signal provided by the longitudinal accelerometer 32 to solve the shear equation. The output of the summing junction 54 is filtered by a turbulence filter 56 to remove the effects of short term gusts to provide a "shear" signal. The "shear" signal may be applied to a display to indicate to the pilot the magnitude of shears being encountered by the aircraft, and may also be applied to a comparator such as the comparator 58 to be compared with a warning threshold reference from a reference circuit 60 which provides a signal representative of a hazardous shear condition. In the event that the shear signal from the filter 56 exceeds the reference signal from the warning threshold reference circuit 60, the comparator would provide a signal to initiate a warning of a dangerous shear condition.

As was discussed above, the normal accelerometer signal is a function not only of vertical acceleration, but also of pitch angle. However, in addition to pitch angle, the normal accelerometer signal is also affected by the roll angle, $\phi$, of the aircraft (FIG. 3). Thus, compensating for roll angle, equation (2) becomes:

$$A_N = [(g + \dot{A}_V) \cos\theta - A_H \sin\theta] \cos\phi, \text{ and equation (3) becomes:} \quad (11)$$

$$A_L = A_H/\cos\theta + A_N \tan\theta/\cos\phi$$

Using the same angle approximation previously applied, the shear equation becomes:

$$\text{Shear} = A_L - \frac{A_N(\alpha + \gamma)}{\cos\phi} - \dot{v} \quad (13)$$

The roll angle $\phi$ can be obtained from a vertical gyro or derived from the rate of change of aircraft heading. Since it is desired to make the system independent of a vertical gyro signal, the second and preferred method will be utilized.

In a steady coordinated turn, the rate of change of heading, $\dot{\Psi}$, is related to the roll angle $\phi$ by:

$$\dot{\psi} = \frac{g}{V_T} \tan\phi, \text{ where } V_T \text{ is true airspeed} \quad (14)$$

$$\cos\phi = \frac{1}{\sqrt{1 + \tan^2\phi}} \quad (15)$$

Substituting:

$$\cos\phi = \frac{1}{\sqrt{1 + \left(\frac{V_T}{g}\dot{\psi}\right)^2}} \quad (16)$$

Thus, the shear equation can be rewritten:

$$\text{Shear} = A_L - A_N \sqrt{1 + \left(\frac{V_T \dot{\psi}}{g}\right)^2} (\alpha + \gamma) - \dot{v} \quad (17)$$

Referring to FIG. 5, there is shown an implementation of a system that compensates for roll angle during an approach or take-off mode according to shear equation (17). The system of FIG. 5 is similar to that of FIG. 4 and similar components will be designated by like reference numerals except that the reference numerals designating such components in FIG. 5 will be primed. The new components utilized to provide for the roll angle compensation include a compass 70 which may be an individual instrument or part of a navigational system, a differentiator and filter circuit 72, a function generator 74 and a multiplier circuit 76. The function of the compass 70 is to provide a heading signal, $\Psi$, (FIG. 4) which is differentiator and filtered by the differentiator and filter 72 to provide a signal representative of the rate of change of heading, $\dot{\Psi}$, to the function generator 74.

The function generator 74 accepts the rate of change of heading signal and the airspeed, v, signal from the airspeed transducer 40' (airspeed, v, may be used as an approximation of true airspeed, $V_T$) and generates the function of the square root of the quantity $$1 + \left(\frac{v}{g}\dot{\psi}\right)^2$$

which is subsequently multiplied by the normal accelerometer signal by the multiplier 76. The multiplier 48' multiplies the signal from the multiplier 76 with the signal from the summing junction 46' to provide a signal representative of the term:

$$A_N \cdot \sqrt{1 + \left(\frac{v}{g} \dot{\psi}\right)^2} \cdot (\alpha + \gamma)$$

A summing junction 54' adds the longitudinal accelerometer signal and subtracts airspeed rate and the signal from the multiplier 48' to provide a signal representative of equation (17). This signal is applied to the turbulence filter 56' which removes high frequency gust components and provides a "shear" signal.

Another way to compensate for roll angle in determining a shear equation is as illustrated in the preferred embodiment below. This way has the advantage over the system illustrated by equations (11)–(17) by further compensating the pitch angle $\theta$ as a function of roll angle $\phi$. In the system heretofore described, although the inertial acceleration was corrected for roll angle, equations (11)–(17) were based upon an assumption that the pitch angle $\theta$ was equal to the sum of the angle of attack ($\alpha$) and the flight path angle ($\gamma$). The following equations f compensate the pitch angle $\theta$ for gyro turn or roll angle $\phi$. This is particularly illustrated in equation 21. Thus, the following equations further eliminate errors in providing a wind shear signal which is independent of gyro turn.

$$A_L = A_H \cos\theta + A_V \sin\theta + g(\sin\phi \tan\phi \cos\theta \sin\alpha + \sin\theta) \tag{18}$$

$$A_N = -A_H \sin\theta \cos\phi + A_V \cos\theta \cos\phi + g(\sin\phi \tan\phi \cos\theta \cos\alpha + \cos\phi \cos\theta) \tag{19}$$

Substituting $A_V$ from (19) into (18) we get $$A_L = \frac{A_H}{\cos\theta} + \frac{A_N \tan\theta}{\cos\phi} \tag{20}$$

Assuming $$\theta = \gamma + \alpha \cos\phi \tag{21}$$

that $\cos\theta = 1$ and $\tan\theta = \theta$ and substituting we obtain $$A_L = A_H + \frac{A_N}{\cos\phi} \cdot \theta - g \tan^2\phi \, (\theta - \alpha \cos\phi) \tag{22}$$

$$A_H = A_L - \frac{A_N}{\cos\phi} \cdot \theta + g \tan^2\phi \, (\theta - \alpha \cos\phi) \tag{23}$$

and the shear equation becomes $$\text{Shear} = A_H - \dot{v} = A_L - \frac{A_N}{\cos\phi}(\theta) - \dot{v} + g \tan^2\phi \, (\theta - \alpha \cos\phi) \tag{24}$$

Substituting $\gamma + \alpha/\cos\phi$ for the pitch angle $\theta$, we obtain the following shear equation $$\text{Shear} = A_L - A_N\left(\alpha + \frac{\gamma}{\cos\phi}\right) + g\gamma \tan^2\phi - \dot{v} \tag{25}$$

Remembering that $$\dot{\psi} = \frac{g}{V_T} \tan\phi \tag{26}$$

and rearranging and squaring $$\tan^2\phi = \left(\frac{v_T}{g} \cdot \dot{\psi}\right)^2 = \text{``}x\text{''}$$

and substituting $$\frac{1}{\cos\phi} = \sqrt{1 + \tan^2\phi} = \sqrt{1 + x} \tag{28}$$

$$\text{Shear} = A_L - A_N(\alpha + \gamma \sqrt{1 + x}) + g\gamma x - \dot{v} \tag{29}$$

A circuit for obtaining the shear equation (25) is illustrated in FIG. 6. The circuit of FIG. 6 includes many components that are similar to corresponding components in FIGS. 2 and 5. Such components will be given the same reference numerals except that they will be either primed or double primed depending on whether they appeared in FIGS. 2 and 5 or in FIG. 5 alone.

Referring to FIG. 6, a vertical speed signal is obtained from a differentiator 42" which receives an input signal from a barometric altimeter 38". The vertical speed signal is divided by an airspeed signal from an airspeed transducer 40" by a divider 44" to provide a flight path angle signal. The flight angle signal from the divider 44" is multiplied by g or 32.2 feet per second by a multiplier 150.

The airspeed signal from the airspeed transducer 40" is multiplied by the rate of change of heading from the differentiator and filter 72" by a multiplier 152. The output of the mult 152 is divided by the acceleration due to gravity by a multiplier 154 to provide a signal representative of the tangent of $\phi$. This signal is squared by a squaring circuit 156 and multiplied by $g\gamma$ (the output of the multiplier 150) by a multiplier circuit 158 to provide the term $g\gamma \tan^2\phi$.

The $\tan^2\phi$ from the squaring circuit 156 is also added to a unity reference signal from a reference source 160 by means of an adder 162. The output of the adder 162 is applied to a square root circuit 164 to provide a signal represenative of the square root of the quantity $1 + \tan^2\phi$.

The flight path angle signal from the divider 44" is multiplied by the output of the square root circuit 164 in a multiplier circuit 166 to provide a signal representative of the flight path angle divided by the cosine of the roll angle. This term is added to the angle of attack term by a summing junction 168 and the result thereof is multiplied by the normal accelerometer signal by a multiplying circuit 170 to provide the $A_N(\alpha + \gamma/\cos\phi)$ term. This term is then subtracted from the longitudinal accelerometer signal by a summing junction 172 and added to the $g\gamma \tan^2\phi$ signal and subtracted from the airspeed rate signal by a summing junction 174 to generate the shear equation.

This wind shear signal is filtered by a filter 56" to remove high frequency gust components and turbulence components to provide a true "shear" signal. The "shear" signal is then compared in a comparator 58" with a warning threshold reference signal 60" to provide a wind shear alert signal when the shear signal is greater than the threshold.

The signals utilized in the preferred embodiment and in the alternate roll angle compensated embodiment are obtained from accelerometers and angle of attack vane, a barometric altimeter and airspeed transducer.

The heading signal may be obtained from an inertial reference system, a directional gyro or a gyro compass magnetic heading reference system. It should be noted that the heading signal must be filtered in order to eliminate the effects of high frequency heading perturbations such as those caused by turbulence. Although the invention contemplates that the heading signal may be compensated with any of a multitude of different filters; whichever filter is used, it is necessary that the filter time constant be large enough to reduce unwanted noise due to turbulence, typically between approximately 2 and 8 seconds. A filter with an appropriate time constant having a transfer function $s/(1+Ts)$ would be suitable.

It should also be noted further that the airspeed signal $V_t$ can be approximated by using either indicated airspeed $V_i$ or computed airspeed $V_c$ when the aircraft is at a low altitude such as during takeoff and landing phases of flight. Since wind shear is most dangerous during the takeoff and landing modes, the approximation is valid.

The basic wind shear system illustrated in FIGS. 2, 5 and 6 may be further optimized to provide the pilot with advisory information and to alter the generation of the wind shear warning. A system for providing such refinements is illustrated in FIG. 7. In FIG. 7, the "shear" signal from and of FIGS. 2, 5 or 6 is applied to an averaging filter 102 whose output then is applied to a pair of comparators 104 and 106. The comparators 104 and 106 compare the filtered "shear" signal with a pair of reference signals, namely, a head shear advisory level and a tail shear advisory level obtained from a head shear advisory reference level circuit 108 and a tail shear advisory reference level circuit 110. If either reference level is exceeded by the filtered shear signal, either a head shear advisory or a tail shear advisory message will be generated. Such an advisory would simply advise the pilot that a wind shear situation exists without requiring him to take any immediate action such as initiating a go-around. The advisory could be given in the form of a voice warning, with a head shear advisory meaning that the type of shear is such that it makes the airplane climb like an increasing head wind or an updraft would do. A tail shear advisory would mean that the shear condition is such that it tends to make the aircraft sink as would a decreasing headwind, an increasing tailwind or a downdraft. Such an advisory indication would be advantageous in a reversing shear type of situation since a head shear followed by a tail shear is particularly hazardous.

The system could also be made responsive to radio altitude to make the system more sensitive near the ground and less sensitive at higher altitudes. For example, the time constant of the averaging filter could be adjusted as a function of altitude, with the time constant being made longer at high altitudes and shorter at low altitudes to reduce response time. In the block diagram illustrated in FIG. 7, a radio altitude signal from a radio altimeter 112 is applied to a function generator 114 to provide a signal which alters the time constant of the averaging filter 102 as a function of radio altitude.

In addition, the criteria for generating a wind shear warning could be altered as a function of various parameters. For example, by utilizing a comparator such as a comparator 116, the criteria at which a wind shear warning would be given could be altered as a function of various flight parameters. For example a hard wind shear warning requiring the pilot to take immediate action would be generated when the wind shear exceeds a predetermined warning reference, such as, for example, 3 knots per second as provided by a basic approach shear warning threshold reference circuit 118. However, the comparator could be biased so that the warning would be given before the basic warning threshold was crossed under particularly hazardous conditions. For example, the warning could be advanced as a function of flight path angle, with the warning being increased for unusually steep flight path angles. For example, by applying the flight path angle signal from the divider 44 or 44' to a function generator 120 a biasing signal that is a function of flight path angle could be generated. This signal could be used to advance the warning by applying the bias signal to the comparator 116 via a summing junction 122.

As previously stated, one particularly hazardous condition exists when a head shear is followed by a tail shear because such a condition results in a rapid loss of air speed that could cause the aircraft to stall if appropriate action is not taken. Thus, a head shear bias circuit 124 is provided to advance the warning in the event of a head shear followed by a tail shear. This is accomplished by peak detecting the "shear" signal, for example, the signal represented by a waveform 126 (FIG. 8) so that any head shear component of the waveform 126 would be peak detected to provide a peak detected head shear signal that slowly washes out as a function of time as is illustrated, for example, by a waveform 128. The peak detected head shear signal would then be applied to the comparator 116, for example, via a summing junction 130 and the summing junction 122 to advance the warning from the normal three knots per second illustrated by the point 132 (FIG. 8) to a lower value, for example, a point 134.

In addition, the warning could be advanced as a function of an increasing tail shear trend. For example, the "shear" signal as represented by the waveform 126 could be differentiated by a trend bias circuit 135 to provide a trend bias signal as illustrated by a waveform 136 (FIG. 9). The trend bias signal from the circuit 135 could be passed through a limiter such as a limiter 140 which would pass only increasing tail shear trends to the comparator 116, for example, via the summing junctions 130 and 122 to bias the comparator 116 to advance the hard warning in the event of an increasing tail shear trend.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A wind shear detection system for an aircraft comprising:
   means for providing a longitudinal accelerometer signal;
   means for providing a normal accelerometer signal;
   means for providing a signal representative of the rate of change of air speed of the aircraft;
   means for providing a signal representative of the flight path angle of the aircraft;
   means for providing a signal representative of the angle of attack of the aircraft;

means for providing a derived acceleration signal by multiplying the normal accelerometer signal by the sum of the flight path angle and angle of attack representative signals and subtracting the result from the longitudinal accelerometer signal; and means for providing a wind shear signal by comparing the signal representative of air speed rate with the derived acceleration signal and generating a signal representative of the difference therebetween.

2. The system recited in claim 1 further including means responsive to said wind shear signal for providing an alert if the difference exceeds a predetermined amount.

3. The system recited in claim 1 further including means for providing a signal representative of the rate of change of heading of the aircraft, and wherein said derived acceleration signal providing means includes means for modifying said inertially derived signal as a function of the rate of change of heading.

4. The system recited in claim 1 further including means for filtering said wind shear signal.

5. A wind shear detection system as recited in claim 1, wherein said means for providing a signal representative of the flight path angle of the aircraft comprises:

first means for providing a signal representative of the rate of change of altitude of the aircraft; and second means responsive to said first means for providing a signal responsive to said signal representative of the airspeed of the aircraft and said signal representative of the rate of change of the altitude of the aircraft for providing a signal representaitve of the flight path angle of the aircraft according to a predetermined relationship.

6. A wind shear detection system as recited in claim 5 wherein said predetermiend relationship is given by dividing the signal representative of the rate of change of altitude by the signal representative of the airspeed of the aircraft.

7. The system as recited in claim 3 wherein said means for providing a signal representative of the rate of change of the heading comprises:

first means for providing a signal representative of the aircraft compass heading; and second means responsive to said first means for differentiating said signal representative of the aircraft compass heading and providing a signal representative of the rate of change thereof.

8. The system as recited in claim 7 further including filtering means for filtering out pertubations in said signal representative of the rate of change of aircraft heading.

9. A wind shear detection system for an aircraft comprising:

first means for providing a signal representative of the longitudinal acceleration of the aircraft; $A_L$;

second means for providing a signal representative of the normal acceleration of the aircraft, $A_N$;

third means for providinga signal representative of the flight path angle $\gamma$ of the aircraft;

fourth means for providing a signal representative of the angle of attack $\gamma$ of the aircraft;

fifth means for providing a signal representative of the rate of change of airspeed of the aircraft, v; and sixth means responsive to said first, second, third, fourth and fifth means for providing a signal representative of the wind shear according to a predetermined relationship therebetween, wherein said predetermined relationship is given by:

$$A_L - A_N(\alpha+\gamma) - \dot{v}.$$

10. The system as recited in claim 9 further including means responsive to said sixth means for providing an alert if the wind shear representative signal exceeds a predetermined value.

11. The system as recited in claim 9 further including means for providing a signal representative of the rate of change of heading of the aircraft, for modifying said wind shear signal as a function of the rate of change of heading.

12. A wind shear detection system for an aircraft comprising:

first means for providing a signal representative of the longitudinal acceleration $A_L$ of an aircraft;

second means for providing a signal representative of the normal acceleration $A_N$ of an aircraft;

third means for providing a signal representative of the rate of change of the airspeed of an aircraft;

fourth means for providing a signal representative of the flight path angle $\gamma$ of the aircraft;

fifth means for providing a signal representative of the angle of attack $\alpha$ of the aircraft;

sixth means for providing a signal representative of the rate of change of heading $\psi$ of the aircraft;

seventh means for providing a signal representative of the true airspeed $V_T$ of the aircraft; and eighth means responsive to said first, second, third, fourth, fifth, sixth and seventh means for providing a signal representative of wind shear according to a predetermined relationship therebetween, wherein said predetermined relationship is defined by:

$$\text{where } x = \frac{A_L - A_N(\alpha+\gamma)\sqrt{1+x} + g\gamma x - \dot{v}}{\left(\frac{v_T}{g}\dot{\psi}\right)^2},$$

and g is the gravitational constant.

13. A method for detecting wind shear of an aircraft comprising the steps of:

providing a longitudinal accelerometer signal;

providing a normal accelerometer signal;

providing a signal representative of the rate of change of airspeed of the aircraft;

providing a signal representative of the flight path angle of the aircraft;

providing a signal representative of the angle attack of the aircraft;

multiplying the noraml accelerometer signal by the sum of the flight path angle and the angle of attack representative signals and subtracting the result form the longitudinal accelerometer signal to provide a derived acceleration signal; and comparing the signal representative of the airspeed rate with the derived acceleration signal and generating a signal representative of the difference therebetween indicative of a wind shear condition.

14. The method as recited in claim 13, further including the step of providing an alert if the difference exceeds a predetermined amount.

15. The method as recited in claim 13, further including the step of providing a signal representative of the rate of change of heading of the aircraft and modifying said derived acceleration signal as a function of the rate of change of heading.

16. A wind shear detection system for an aircraft comprising:
   means for providing a longitudianl accelerometer signal;
   means for providing a normal accelerometer signal;
   means for providing a signal representative of the rate of change of air speed of the aircraft;
   means for providing a signal representative of the flight path angle of the aircraft;
   means for providing a signal representative of the angle of attack of the aircraft;
   means for multiplying the normal accelerometer signal by the sum of the flight path angle and angle of attack representative signals and subtracting the result from the longitudinal accelerometer signal to provide a derived acceleration signal;
   means for providing a wind shear signal by comparing the signal representative of air speed rate with the derived acceleration signal and generating a signal representative of the difference therebetween;
   means responsive to said wind shear signal for comparing said wind shear signal with a predetermined value and providing a signal indicative of a head shear when said wind shear signal is greater than a predetermined amount.

17. A wind shear detection system for an aircraft comprising:
   means for providing a longitudinal accelerometer signal;
   means for providing a normal accelerometer signal;
   means for providing a signal representative of the rate of change of air speed of the aircraft;
   means for providing a signal representative of the flight path angle of the aircraft;
   means for providing a signal representative of the angle of attack of the aircraft;
   means for multiplying the normal accelerometer signal by the sum of the flight path angle and angle of attach representative signals and subtracting the result from the longitudinal accelerometer signal to provide a derived acceleration signal;
   means for providing a wind shear signal by comparing the signal representative of air speed rate with the derived acceleration signal and generating a signal representative of the difference therebetween;
   means responsive to said wind shear signal for comparing said signal with a predetermined value and providing a tail shear advisory when said difference exceeds a second signal indicative of a predetermined amount.

18. A wind shear detection system for a aircraft comprising:
   means for providing a longitudinal accelerometer signal;
   means for providing a normal accelerometer signal;
   means for providing a signal representative of the rate of change of air speed of the aircraft;
   means for providing a signal representative of the flight path angle of the aircraft;
   means for providing a signal representative of the angle of attack of the aircraft;
   means for multiplying the normal accelerometer signal by the sum of the fight path angle and angle of attack representative signals and subtracting the result from the longitudinal accelerometer signal to provide a derived acceleration signal;
   means for providing a wind shear signal by comparing the signal representative of air speed rate with the derived acceleration signal and generating a signal representative of the difference therebetween;
   means responsive to said wind shear signal for providing a wind shear warning when said wind shear signal exceeds a predetermined level; and
   means for altering said predetermined level as a function of previous values of the shear signal.

19. A wind shear detection system for an aircraft comprising:
   means for providing a longitudianl accelerometer signal:
   means for providing a normal accelerometer signal;
   means for providing a signal representative of the rate of change of air speed of the aircraft;
   means for providing a signal representative of the flight path angle of the aircraft;
   means for providig a signal representative of the angle of attack of the aircraft;
   means for multiplying the normal accelerometer signal by the sum of the flight path angle and angle of attack representative signals and substracting the result from the lngitudinal accelerometer signal to provide a derived acceleration signal; means for providing a windshear signal by comparing the signal representative of air speed rate with the derived acceleration signal and generating a signal representative of the difference therebetween;
   means responsive to said wind shear signal for providing a wind shear warning when said shear signal exceeds a predetermined level; and
   means for altering said predetermined level as a function of whether values of wind shear signals are increasing or decreasing.

20. A wind shear detection system for an aircraft comprising:
   means for providing a longitudinal accelerometer signal;
   means for providing a normal accelerometer signal;
   means for providing a signal representative of the rate of change of air speed of the aircraft;
   means for providing a signal representative of the flight path angle of the aircraft;
   means for providing a signal representative of the angle of attack of the aircraft;
   means for multiplying the normal accelerometer signal by the sum of the flight path angle and angle of attack representative signals and subtracting the result from the longitudinal accelerometer signal to provide a derived acceleration signal;
   means for providing a wind shear signal by comparing the signal representative of air speed rate with the derived acceleration signal and generating a signal representative of the difference therebetween;
   means responsive to said wind shear signal for providing a wind shear warning when said wind shear signal exceeds a predetermined level; and
   means for altering said predetermined level as a function of flight path angle of the aircraft.

21. A wind shear detection system for an aircraft comprising:
   means for providing a longitudinal accelerometer signal;

means for providing a normal accelerometer signal;
means for providing a signal representative of the rate of change of air speed of the aircraft;
means for providing a signal representative of the flight path angle of the aircraft;
means for providing a signal representative of the angle of attack of the aircraft;
means for multiplying the normal accelerometer signal by the sum of the flight path angle and angle of attack representative signals and subtracting the result from the longitudinal accelerometer signal to provide a derived acceleration signal;
means for providing a wind shear signal by comparing the signal representative of air speed rate with the derived acceleration signal and generating a signal representative of the difference therebetween;
means responsive to said wind shear signal for generating a wind shear warning at a time when said wind shear signal exceed Ⓡa predetermined level; and
means resposnive to the altitude of the aircraft above ground for alterig the time at which the warning is generated as a function of radio altitude.

22. A wind shear detection system for an aircraft comprising:
means for providing a longitudinal accelerometer signal;
means for providing a normal accelerometer signal;
means for providing a signal representative of the rate of change of airspeed of the aircraft;
means for providing a signal representative of the flight path angle of the aircraft;
means for providing a signal representative of the angle of attack of the aircraft;
means for providing a derived acceleration signal without utilizing a gyroscope by multiplying the normal accelerometer signal by the sum of the flight path angle and angle of attack representative signals and subtracting the result from the longitudinal accelerometer signal; and means for providing a wind shear signal by comparing the signal representative of airspeed rate with the derived acceleration signal and generating a signal representative of the difference therebetween.

23. A wind shear detection system as recited in claim 22 further including means for providing a signal representative of the rate of change of heading of the aircraft, means for providing a signal representative of the true airspeed of the aircraft wherein said derived acceleration signal providing means is operative to combine the signals from the rate of change of heading signal providing means and the true airspeed signal providing means with the signals from the normal accelerometer, the flight path angle signal providing means, the angle of attack signal providing means and the longitudinal accelerometer to provide the derived acceleration signal.

* * * * *